(12) United States Patent
Wang (10) Patent No.: US 10,432,285 B2
(45) Date of Patent: Oct. 1, 2019

(54) DATA TRANSMISSION METHOD, SYSTEM, AND DEVICE

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 15/508,855

(22) PCT Filed: Sep. 5, 2014

(86) PCT No.: PCT/CN2014/085960
§ 371 (c)(1),
(2) Date: Mar. 3, 2017

(87) PCT Pub. No.: WO2016/033789
PCT Pub. Date: Mar. 10, 2016

(65) Prior Publication Data
US 2017/0279512 A1    Sep. 28, 2017

(51) Int. Cl.
| | |
|---|---|
| H04W 4/00 | (2018.01) |
| H04B 7/06 | (2006.01) |
| H04L 5/00 | (2006.01) |
| H04W 72/04 | (2009.01) |
| H04W 24/10 | (2009.01) |
| H04W 72/08 | (2009.01) |

(52) U.S. Cl.
CPC ......... *H04B 7/0626* (2013.01); *H04L 5/0007* (2013.01); *H04L 5/0053* (2013.01); *H04W 24/10* (2013.01); *H04W 72/0406* (2013.01); *H04W 72/08* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 9,491,648 B2 | 11/2016 | Choi et al. | |
| 2010/0302962 A1* | 12/2010 | Oota | H04W 8/24 370/252 |
| 2012/0134275 A1* | 5/2012 | Choi | H04L 5/0057 370/241 |

FOREIGN PATENT DOCUMENTS

| | | |
|---|---|---|
| CN | 102474347 A | 5/2012 |
| CN | 102625355 A | 8/2012 |
| CN | 103312388 A | 9/2013 |
| CN | 103580739 A | 2/2014 |
| CN | 103580779 A | 2/2014 |
| EP | 2809101 A1 | 12/2014 |

(Continued)

*Primary Examiner* — Zewdu A Beyen
(74) *Attorney, Agent, or Firm* — Leydig, Voit & Mayer, Ltd.

(57) ABSTRACT

A method includes: generating, by user equipment, at least one piece of channel state information, wherein each piece of channel state information in the at least one piece of channel state information is corresponding to at least one resource unit required for sending data by a base station; and sending, by the user equipment, multiple pieces of channel state information, so that the base station sends data on a corresponding resource unit according to channel state information. Therefore, channel state information sent by the user equipment is associated with a resource unit required for sending data by the user equipment.

18 Claims, 3 Drawing Sheets

(56) References Cited

FOREIGN PATENT DOCUMENTS

| EP | 2858401 A1 | 4/2015 |
|---|---|---|
| WO | WO 2013111412 A1 | 8/2013 |
| WO | WO 2013170618 A1 | 11/2013 |

\* cited by examiner

DATA TRANSMISSION METHOD, SYSTEM, AND DEVICE

CROSS-REFERENCE TO RELATED APPLICATIONS

This application is a national stage of International Application No.PCT/CN2014/085960, filed Sep. 5, 2014, which is incorporated by reference herein in its entirety.

TECHNICAL FIELD

The present invention relates to the field of communications technologies, and in particular, to a data transmission method and system, and a device.

BACKGROUND

Spectrum used in an existing wireless communications system is classified into two types: licensed spectrum (English: licensed spectrum) and unlicensed spectrum (English: unlicensed spectrum). Any operator may deploy a device in an unlicensed frequency band, for example, wireless fidelity (English full name: wireless fidelity, English acronym: WiFi) devices in a 2.4 GHz frequency band and a 5 GHz frequency band.

For a Long Term Evolution (English full name: Long Term Evolution, English acronym: LTE) node deployed in an unlicensed (English: unlicensed) frequency band (LTE-U node for short), that is, an LTE node (for example, a base station) deployed in an unlicensed frequency band, each LTE-U node may suffer interference caused by sending data by another LTE-U node. To reduce interference as much as possible, in the prior art, user equipment first performs joint estimation on an entire channel, and the user equipment sends channel state information (English full name: channel state information, English acronym: CSI) to a base station according to a joint estimation result, and then the base station sends data according to the CSI information.

However, an LTE-U node suffers different interference when sending data in different time periods. Therefore, interference suffered by the LTE-U node when the LTE-U node sends any data cannot be faithfully reflected by CSI information that is of the entire channel and that is sent by the user equipment.

SUMMARY

Embodiments of the present invention provide a data transmission method and system, and a device, so as to associate channel state information sent by user equipment with a resource unit required for sending data by a base station, thereby faithfully reflecting interference suffered by the base station when the base station sends any data.

According to a first aspect, a data transmission method is provided, including:

generating, by user equipment, at least one piece of channel state information, where each piece of channel state information in the at least one piece of channel state information is corresponding to at least one resource unit required for sending data by a base station; and sending, by the user equipment, the at least one piece of channel state information to the base station, where the at least one piece of channel state information is reference information used for sending data by the base station on the at least one resource unit corresponding to the at least one piece of channel state information.

With reference to the first aspect, in a first possible implementation manner of the first aspect, a sending order of the at least one piece of channel state information is determined by the user equipment based on an order agreed between the user equipment and the base station, and a mapping relationship exists between the sending order of the at least one piece channel station information and an identifier of the at least one resource unit.

With reference to the first aspect, in a second possible implementation manner of the first aspect, the method further includes:

sending, by the user equipment to the base station, indication information of the at least one resource unit corresponding to the at least one piece of channel state information, where the indication information is used to indicate the at least one resource unit.

With reference to the second possible implementation manner of the first aspect, in a third possible implementation manner of the first aspect, a sending order of the at least one piece of channel state information is determined by the user equipment based on an order agreed between the user equipment and the base station, and a sending order of the indication information is determined by the user equipment based on the agreed order.

With reference to the first aspect, in a fourth possible implementation manner of the first aspect, the sending, by the user equipment, the at least one piece of channel state information to the base station includes:

sending, by the user equipment to the base station, the at least one piece of channel state information and indication information of the at least one resource unit corresponding to the at least one piece of channel state information, where the indication information is used to indicate the at least one resource unit.

With reference to any one of the first aspect, or the first to the fourth possible implementation manners of the first aspect, in a fifth possible implementation manner of the first aspect, the method further includes:

sending, by the user equipment, feedback mode indication information to the base station, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or the channel state information sent by the user equipment to the base station is information about an entire channel between the user equipment and the base station when the feedback mode indication information indicates the second feedback mode.

According to a second aspect, a data transmission method is provided, including:

receiving, by a base station, at least one piece of channel state information sent by user equipment, where each piece of channel state information in the at least one piece of channel state information is corresponding to at least one resource unit required for sending data by the base station;

determining, by the base station, the at least one resource unit corresponding to the at least one piece of channel state information; and sending, by the base station on the at least one resource unit corresponding to the at least one piece of channel state information, data to the user equipment according to the at least one piece of channel state information.

With reference to the second aspect, in a first possible implementation manner of the second aspect, the determining, by the base station, the at least one resource unit corresponding to the at least one piece of channel state information includes:

determining, according to a receiving order of the at least one piece of channel state information, the at least one resource unit corresponding to the at least one piece of channel state information, where a mapping relationship exists between the receiving order of the at least one piece of channel state information and an identifier of the at least one resource unit.

With reference to the second aspect, in a second possible implementation manner of the second aspect, before the determining, by the base station, the at least one resource unit corresponding to the at least one piece of channel state information, the method further includes:

receiving, by the base station, indication information that is of the at least one resource unit corresponding to the at least one piece of channel state information and that is sent by the user equipment, where the indication information is used to indicate the at least one resource unit; and the determining, by the base station, the at least one resource unit corresponding to the at least one piece of channel state information includes: determining, by the base station, the at least one resource unit according to the indication information.

With reference to the second possible implementation manner of the second aspect, in a third possible implementation manner of the second aspect, when a receiving order of the at least one piece of channel state information is the same as a receiving order of the indication information, a mapping relationship exists between the at least one piece of channel state information and the indication information.

With reference to the second aspect, in a fourth possible implementation manner of the second aspect, the receiving, by a base station, at least one piece of channel state information sent by user equipment includes: receiving, by the base station, the at least one piece of channel state information and indication information of the at least one resource unit corresponding to the at least one piece of channel state information that are sent by the user equipment, where the indication information is used to indicate the at least one resource unit; and the determining, by the base station, the at least one resource unit corresponding to the at least one piece of channel state information includes: determining, by the base station, the at least one resource unit according to the indication information.

With reference to any one of the second aspect, or the first to the fourth possible implementation manners of the second aspect, in a fifth possible implementation manner of the second aspect, before the determining, by the base station, the at least one resource unit corresponding to the at least one piece of channel state information, the method further includes:

receiving, by the base station, feedback mode indication information sent by the user equipment, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or the channel state information sent by the user equipment to the base station is information about an entire channel between the user equipment and the base station when the feedback mode indication information indicates the second feedback mode.

According to a third aspect, user equipment is provided, including:

a generation unit, configured to at least one piece of channel state information, where each piece of channel state information in the at least one piece of channel state information is corresponding to at least one resource unit required for sending data by a base station; and a sending unit, configured to send, to the base station, the at least one piece of channel state information generated by the generation unit, where the at least one piece of channel state information is reference information used for sending data by the base station on the at least one resource unit corresponding to the at least one piece of channel state information.

With reference to the third aspect, in a first possible implementation manner of the third aspect, the sending unit is specifically configured to send the at least one piece of channel state information to the base station according to an order agreed between the user equipment and the base station, where a mapping relationship exists between a sending order of the at least one piece of channel state information and an identifier of the at least one resource unit.

With reference to the third aspect, in a second possible implementation manner of the third aspect, the sending unit is further configured to send, to the base station, indication information of the at least one resource unit corresponding to the at least one piece of channel state information, where the indication information is used to indicate the at least one resource unit.

With reference to the second possible implementation manner of the third aspect, in a third possible implementation manner of the third aspect, a sending order of the at least one piece of channel state information is determined by the user equipment based on an order agreed between the user equipment and the base station, and a sending order of the indication information is determined by the user equipment based on the agreed order.

With reference to the third aspect, in a fourth possible implementation manner of the third aspect, the sending unit is specifically configured to send, to the base station, the at least one piece of channel state information and indication information of the at least one resource unit corresponding to the at least one piece of channel state information, where the indication information is used to indicate the at least one resource unit.

With reference to any one of the third aspect, or the first to the fourth possible implementation manners of the third aspect, in a fifth possible implementation manner of the third aspect, the sending unit is further configured to send feedback mode indication information to the base station, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or channel state information sent by the user equipment to the base station is information about an entire channel between the user equipment and the base station when the feedback mode indication information indicates the second feedback mode.

According to a fourth aspect, a base station is provided, including:

a receiving unit, configured to receive at least one piece of channel state information sent by user equipment, where each piece of channel state information in the at least one piece of channel state information is corresponding to at least one resource unit required for sending data by the base station;

a determining unit, configured to determine the at least one resource unit corresponding to the at least one piece of channel state information received by the receiving unit; and a sending unit, configured to send, on the at least one resource unit corresponding to the at least one piece of channel state information, data to the user equipment according to the at least one piece of channel state information received by the receiving unit.

With reference to the fourth aspect, in a first possible implementation manner of the fourth aspect, the determining unit is specifically configured to determine, according to a receiving order of the at least one piece of channel state information, the at least one resource unit corresponding to the at least one piece of channel state information, where a mapping relationship exists between the receiving order of the at least one piece of channel state information and an identifier of the at least one resource unit.

With reference to the fourth aspect, in a second possible implementation manner of the fourth aspect, the receiving unit is further configured to receive indication information that is of the at least one resource unit corresponding to the at least one piece of channel state information and that is sent by the user equipment, where the indication information is used to indicate the at least one resource unit; and the determining unit is specifically configured to determine the at least one resource unit according to the indication information received by the receiving unit.

With reference to the second possible implementation manner of the fourth aspect, in a third possible implementation manner of the fourth aspect, when a receiving order of the at least one piece of channel state information is the same as a receiving order of the indication information, a mapping relationship exists between the at least one piece of channel state information and the indication information.

With reference to the fourth aspect, in a fourth possible implementation manner of the fourth aspect, the receiving unit is specifically configured to receive the at least one piece of channel state information and indication information of the at least one resource unit corresponding to the at least one piece of channel state information that are sent by the user equipment, where the indication information is used to indicate the at least one resource unit; and the determining unit is specifically configured to determine the at least one resource unit according to the indication information.

With reference to any one of the fourth aspect, or the first to the fourth possible implementation manners of the fourth aspect, in a fifth possible implementation manner of the fourth aspect, the receiving unit is further configured to receive feedback mode indication information sent by the user equipment, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or the channel state information sent by the user equipment to the base station is information about an entire channel between the user equipment and the base station when the feedback mode indication information indicates the second feedback mode.

According to a fifth aspect, user equipment is provided, including a processor and a transceiver that are separately connected to a bus, where the processor is configured to perform the following operations:

generating at least one piece of channel state information, where each piece of channel state information in the at least one piece of channel state information is corresponding to at least one resource unit required for sending data by a base station; and controlling the transceiver to send the at least one piece of channel state information to the base station, where the at least one piece of channel state information is reference information used for sending data by the base station on the at least one resource unit corresponding to the at least one piece of channel state information.

With reference to the fifth aspect, in a first possible implementation manner of the fifth aspect, a sending order of the at least one piece of channel state information is determined by the user equipment based on an order agreed between the user equipment and the base station, and a mapping relationship exists between the sending order of the at least one piece channel station information and an identifier of the at least one resource unit.

With reference to the fifth aspect, in a second possible implementation manner of the fifth aspect, the processor is further configured to control the transceiver to send, to the base station, indication information of the at least one resource unit corresponding to the at least one piece of channel state information, where the indication information is used to indicate the at least one resource unit.

With reference to the second possible implementation manner of the fifth aspect, in a third possible implementation manner of the fifth aspect, a sending order of the at least one piece of channel state information is determined by the user equipment based on an order agreed between the user equipment and the base station, and a sending order of the indication information is determined by the user equipment based on the agreed order.

With reference to the fifth aspect, in a fourth possible implementation manner of the fifth aspect, the processor is specifically configured to control the transceiver to send, to the base station, the at least one piece of channel state information and indication information of the at least one resource unit corresponding to the at least one piece of channel state information, where the indication information is used to indicate the at least one resource unit.

With reference to any one of the fifth aspect, or the first to the fourth possible implementation manners of the fifth aspect, in a fifth possible implementation manner of the fifth aspect, the processor is further configured to control the transceiver to send feedback mode indication information to the base station, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or the channel state information sent by the user equipment to the base station is information about an entire channel between the user equipment and the base station when the feedback mode indication information indicates the second feedback mode.

According to a sixth aspect, a base station is provided, including a processor and a transceiver that are separately connected to a bus, where the processor is configured to perform the following operations:

when the transceiver receives at least one piece of channel state information, determining at least one resource unit corresponding to the at least one piece of channel state information, where each piece of channel state information in the at least one piece of channel state information is corresponding to the at least one resource unit required for sending data by the base station; and controlling, according to the at least one piece of channel state information, the transceiver to send data to the user equipment on the at least one resource unit corresponding to the at least one piece of channel state information.

With reference to the fifth aspect, in a first possible implementation manner of the sixth aspect, the processor is specifically configured to determine, according to a receiving order of the at least one piece of channel state information, the at least one resource unit corresponding to the at least one piece of channel state information, where a mapping relationship exists between the receiving order of the at least one piece of channel state information and an identifier of the at least one resource unit.

With reference to the fifth aspect, in a second possible implementation manner of the sixth aspect, the transceiver is further configured to receive indication information that is of the at least one resource unit corresponding to the at least one piece of channel state information and that is sent by the user equipment, where the indication information is used to indicate the at least one resource unit; and the processor is specifically configured to determine the at least one resource unit according to the indication information.

With reference to the second possible implementation manner of the sixth aspect, in a third possible implementation manner of the sixth aspect, when a receiving order of the at least one piece of channel state information is the same as a receiving order of the indication information, a mapping relationship exists between the at least one piece of channel state information and the indication information.

With reference to the fifth aspect, in a fourth possible implementation manner of the sixth aspect, the transceiver is specifically configured to receive the at least one piece of channel state information and indication information of the at least one resource unit corresponding to the at least one piece of channel state information that are sent by the user equipment, where the indication information is used to indicate the at least one resource unit; and the processor is specifically configured to determine the at least one resource unit according to the indication information.

With reference to any one of the sixth aspect, or the first to the fourth possible implementation manners of the sixth aspect, in a fifth possible implementation manner of the sixth aspect, the transceiver is further configured to receive feedback mode indication information sent by the user equipment, where the feedback mode indication information is used to indicate that a mode in which the user equipment sends channel state information is a first feedback mode or a second feedback mode; and the at least one piece of channel state information is corresponding to the at least one resource unit when the feedback mode indication information indicates the first feedback mode; or the channel state information sent by the user equipment to the base station is information about an entire channel between the user equipment and the base station when the feedback mode indication information indicates the second feedback mode.

According to a seventh aspect, a data transmission system is provided, including:

the user equipment according to any one of the third aspect of the embodiments of the present invention, or the first to the fifth possible implementation manners of the third aspect, and the base station according to any one of the fourth aspect of the embodiments of the present invention, or the first to the fifth possible implementation manners of the fourth aspect; or the user equipment according to any one of the fifth aspect of the embodiments of the present invention, or the first to the fifth possible implementation manners of the fifth aspect, and the base station according to any one of the sixth aspect of the embodiments of the present invention, or the first to the fifth possible implementation manners of the sixth aspect.

It can be learned that in the foregoing technical solutions, instead of performing joint estimation on an entire channel and then sending one piece of channel state information to a base station, user equipment divides the entire channel into multiple parts (that is, multiple sub-channels) for separate estimation to generate at least one piece of channel state information, where the at least one piece of channel state information is separately associated with a resource unit required for sending data by the base station, and the user equipment sends the at least one piece of channel state information to the base station. The at least one piece of channel state information can more accurately reflect interference suffered by the base station when the base station sends data, so as to avoid interference as much as possible when the base station sends data.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
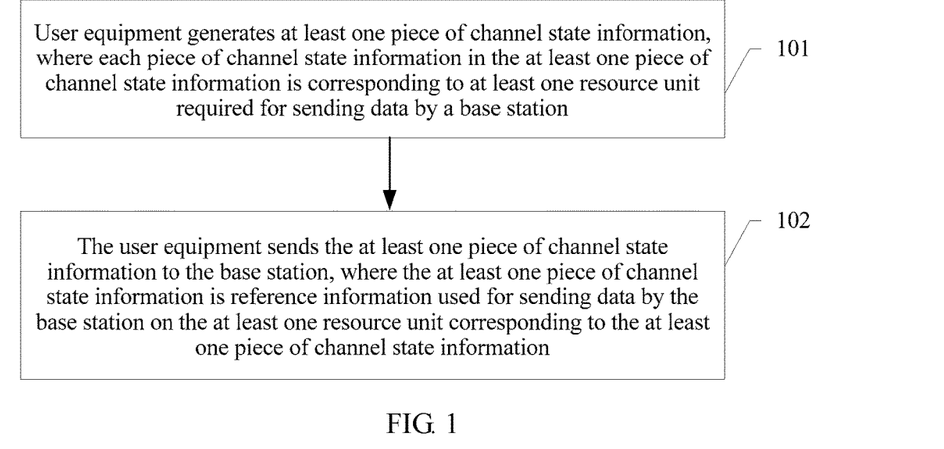
FIG. 1 is a flowchart of a data transmission method according to an embodiment of the present invention.

In an embodiment of the present invention, a data transmission method is provided, and may be applied to a general communications system such as an LTE system including user equipment and a base station. The method in this embodiment is executed by user equipment, and as shown in FIG. 1, includes the following steps.

Step 101. The user equipment generates at least one piece of channel state information, where each piece of channel state information in the at least one piece of channel state information is corresponding to at least one resource unit required for sending data by a base station.

In a broad sense, the channel state information herein may refer to any information about a channel, and specifically, may include but be not limited to any one or more types of the following information: a rank indication (English full name: rand indication, English acronym: RI), a precoding matrix indicator (English full name: precoding matrix indicator, English acronym: PMI), a channel state indicator (English full name: channel quality indicator, English acronym: CQI), a precoding type indicator (English full name: Precoding Type Indicator, English acronym: PTI), a signal-to-interference plus noise ratio (English full name: Signal to Interference plus Noise Ratio, English acronym: SINR), signal strength, interference strength, whether a channel is blocked, and the like.

It can be understood that before the base station sends data, the user equipment first estimates information about a channel between the user equipment and the base station, for example, information about interference on the channel, so that the base station can learn resources on which the base station sends data with relatively less interference. In this embodiment, instead of performing joint estimation on an entire channel, the user equipment separately estimates one or more sub-channels included in the entire channel to obtain the at least one piece of channel state information. The sub-channel is a sub-channel corresponding to the at least one resource unit used for sending data by the base station to the user equipment. The resource unit herein is a minimum unit of a resource used for sending data by the base station, for example, a subframe.

It should be noted that one piece of channel state information may be corresponding to multiple resource units, and interference suffered by the base station when the base station separately sends data on the multiple resource units is similar. In this way, the base station can send, on the multiple resource units, data by using one piece of channel state information. In a specific implementation process, the user equipment may determine, according to signal strength of signals (including a wanted signal and an interference signal) sent by the base station on all resource units, resource units on which the base station sends data with similar interference. For example, when signal strength of interference signals is approximately the same, interference is similar.

For example, if a data frame in the LTE system includes 10 data subframes, the user equipment may perform independent estimation on a sub-channel corresponding to each data subframe in the 10 data subframes; or perform estimation, smoothing, and filtering on sub-channels corresponding to the first five data subframes in the 10 data subframes to obtain channel state information; or perform estimation, smoothing, and filtering only on the last five data subframes to obtain channel state information.

Step 102. The user equipment sends the at least one piece of channel state information generated in step 101 to the base station, where the at least one piece of channel state information is reference information used for separately sending data by the base station on the at least one resource unit corresponding to the at least one piece of channel state information.

Specifically, a sending order for sending the at least one piece of channel state information by the user equipment is determined by the user equipment according to an order agreed between the user equipment and the base station, where a mapping relationship exists between the sending order of the at least one piece of channel state information and an identifier of the at least one resource unit. The sending order may be specifically but not limited to the following agreed orders:

(1) The user equipment sends the corresponding channel state information to the base station according to a location order, in one data sending period, of the resource unit required for sending data by the base station.

(2) The at least one piece of channel state information sent by the user equipment to the base station according to a specific order is separately and sequentially corresponding to resources units in some locations in one data sending period. For example, the first piece of channel state information sent by the user equipment is corresponding to a resource unit ranked in the first place (or another place) in the data sending period.

It can be learned that in the method provided in this embodiment of the present invention, user equipment divides an entire channel into multiple parts (that is, multiple sub-channels) for separate estimation to generate at least one piece of channel state information. The at least one piece of channel state information is separately associated with a resource unit required for sending data by a base station, and the user equipment sends the at least one piece of channel state information to the base station. The at least one piece of channel state information can more accurately reflect interference suffered by the base station when the base station sends data, so as to avoid interference as much as possible when the base station sends data.

In a specific embodiment, in addition to performing step 101 and step 102, optionally, the user equipment further needs to send indication information of the at least one resource unit corresponding to the at least one piece of channel state information. The indication information is used to indicate the at least one resource unit and clearly and explicitly notify the base station of a mapping relationship between each channel state information and a resource unit. Specifically, the indication information may be sent in the following manners.

(1) A sending order of the at least one piece of channel state information is determined by the user equipment based on an order agreed between the user equipment and the base station, and a sending order of the indication information is determined by the user equipment based on the agreed order.

In one case, when sending the indication information of the resource unit to the base station, the user equipment specifically sends, according to the sending order of the at least one piece of channel state information, the indication information of the at least one resource unit corresponding to the at least one piece of channel state information. Indication information corresponding to each piece of channel state information in the at least one piece of channel state information includes identifier information of the at least one resource unit. For example, the first piece of channel state information sent by the user equipment is corresponding to a resource unit indicated by the first sent indication information of the at least one resource unit.

It can be understood that in this case, the user equipment may separately send the at least one piece of channel state information and the indication information of the resource unit to the base station, that is, first send the at least one piece of channel state information and then send indication information respectively corresponding to the at least one piece of channel state information. In another case, the user equipment may first send the indication information of the at least one resource unit to the base station, and then send, according to an order for sending the indication information of the at least one resource unit, channel state information respectively corresponding to the indication information of the at least one resource unit.

(2) When performing the foregoing step 102, the user equipment specifically sends, to the base station, the at least one piece of channel state information and the indication information of the at least one resource unit separately corresponding to the at least one piece of channel state information. For example, the user equipment directly sends at least one group of information to the base station, and each group of information in the at least one group of information includes: one piece of channel state information in the at least one piece of channel state information and indication information (for example, the indication information may be an identifier of the at least one resource unit) of the at least one resource unit.

In this case, while sending one piece of channel state information to the base station, the user equipment needs to send, to the base station, the indication information of the resource unit corresponding to the channel state information. The indication information and the channel state information are not sent separately. In this way, the base station can more directly determine specific channel state information corresponding to a specific resource unit.

In another specific embodiment, there is a relatively small difference between interference suffered by the base station when the base station sends data in all resource units. For example, if no other base station is deployed within a preset distance range from the base station, the channel state information may be sent without requiring a manner of step 101 and step 102. In this case, the user equipment needs to send feedback mode indication information to the base station. The feedback mode indication information is used to indicate that a mode in which the user equipment sends channel state information is a first feedback mode or a second feedback mode. The user equipment performs step 101 and step 102 when the feedback mode indication information indicates the first feedback mode. That is, each piece of channel state information in the at least one piece of generated channel state information is corresponding to the at least one resource unit, and the at least one piece of channel state information is sent to the base station.

When the feedback mode indication information is used to indicate that the mode in which the user equipment sends channel state information is the second feedback mode, the user equipment performs joint estimation on the entire channel between the user equipment and the base station, generates channel state information of the entire channel, and sends the channel state information to the base station.

The first feedback mode is a manner in which the at least one piece of channel state information is corresponding to the at least one resource unit. The second feedback mode is a manner in which channel state information is not bound to a resource unit and channel state information sent by the user equipment to the base station is information about the entire channel between the user equipment and the base station.

Figure 2:
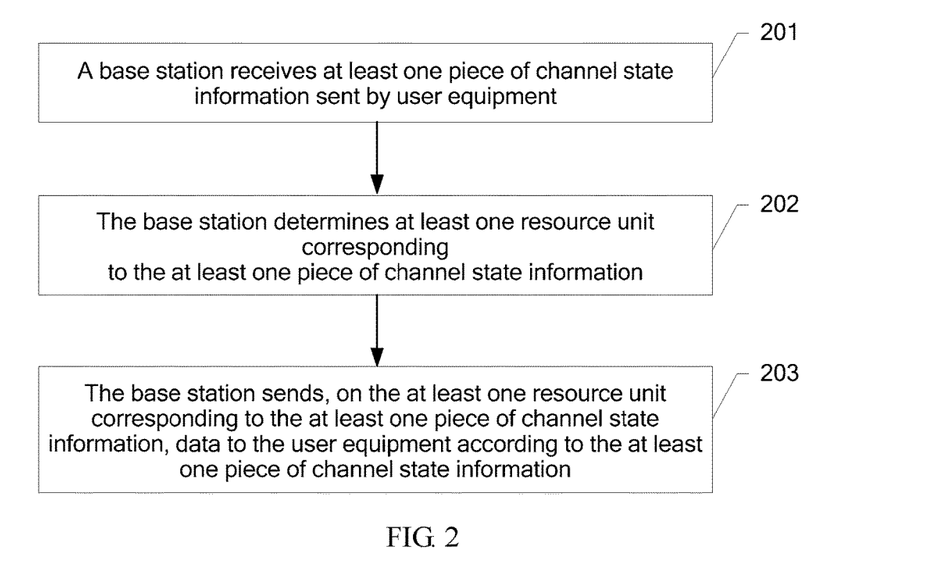
FIG. 2 is a flowchart of another data transmission method according to an embodiment of the present invention.

In an embodiment of the present invention, another data transmission method is provided, and may be applied to a general communications system such as an LTE system including user equipment and a base station. The method in this embodiment is executed by a base station, and as shown in FIG. 2, includes the following steps.

Step 201. The base station receives at least one piece of channel state information sent by user equipment, where each piece of channel state information in the at least one piece of channel state information is corresponding to at least one resource unit required for sending data by the base station.

It can be understood that before the base station sends data, correspondingly, the user equipment sends the at least one piece of channel state information according to the data transmission method executed by the user equipment in the foregoing embodiment, and details are not described herein.

Step 202. The base station determines the at least one resource unit separately corresponding to the at least one piece of channel state information.

Step 203. The base station sends, on the at least one resource unit corresponding to the at least one piece of channel state information, data to the user equipment according to the at least one piece of channel state information. Specifically, when sending data to the user equipment on at least one corresponding resource unit according to one piece of channel state information, the base station may send data on the at least one corresponding resource unit by using a parameter indicated by the channel state information.

It can be learned that in the method provided in this embodiment of the present invention, when sending data, a base station sends data on different resource units by using different pieces of channel state information. The channel state information can more accurately reflect interference suffered by the base station when the base station sends data, so as to avoid interference as much as possible during data sending.

In a specific embodiment, a manner in which the base station performs step 202 of determining the at least one resource unit separately corresponding to the at least one piece of channel state information may include but is not limited to the following manners.

(1) When the user equipment sends the at least one piece of channel state information according to an order agreed between the base station and the user equipment, when performing step 202, the base station specifically determines, according to a receiving order of the at least one piece of channel state information, the at least one resource unit corresponding to the at least one piece of channel state information. A mapping relationship exists between the receiving order of the at least one piece of channel state information and an identifier of the at least one resource unit.

In one case, the user equipment sends the at least one piece of channel state information according to a location order, in one data sending period, of the resource unit required for sending data by the base station. When performing step 202, the base station determines the resource unit according to the location order in the data sending period and the receiving order of receiving the channel state information by the base station. For example, the first piece of channel state information received by the base station in one data sending period is corresponding to the first resource unit (for example, a subframe) in a location order in the data sending period.

In another case, if the user equipment sends the at least one piece of channel state information according to a preset order, and the preset order is any sorting order, in one data sending period, of all resource units required for sending data by the base station, for each piece of channel state information in the foregoing multiple pieces of channel state information, the base station determines a resource unit according to the preset order and an order in which the base station receives the channel state information. For example, the first piece of channel state information received by the base station in one data sending period is corresponding to a resource unit (for example, a subframe) ranked in the first place in the preset order. The resource unit ranked in the first place in the preset order may be a resource unit at any location in one data sending period.

(2) Before performing step 202, the base station further receives indication information that is of the at least one resource unit corresponding to the at least one piece of channel state information and that is sent by the user equipment. When performing step 202, the base station may determine, according to the received indication information, the at least one resource unit corresponding to the at least one piece of channel state information.

Specifically, if the user equipment sends, according to a sending order of the at least one piece of channel state information, the indication information of the at least one resource unit corresponding to the at least one piece of channel state information, when a receiving order of the at least one piece of channel state information is the same as a receiving order of the indication information, a mapping relationship exists between the at least one piece of channel state information and the indication information. When performing the foregoing step 202, for each piece of channel state information in the at least one piece of channel state information, the base station determines that the channel state information is corresponding to a resource unit indicated by indication information whose receiving order is consistent with an order in which the base station receives the channel state information. For example, the first piece of channel state information received by the base station is corresponding to a resource unit (for example, a subframe) indicated by the first piece of received indication information.

If the user equipment sends, when the user equipment sends the at least one piece of channel state information to the base station, both the at least one piece of channel state information and the indication information of the at least one resource unit corresponding to the at least one piece of channel state information, the base station specifically receives, when the base station performs step 201 of receiving the at least one piece of channel state information, the at least one piece of channel state information and the indication information of the at least one resource unit corresponding to the at least one piece of channel state information that are sent by the user equipment. For example, at least one group of information sent by the user equipment is received, and each group of information in the at least one group of information includes: one piece of channel state information in the at least one piece of channel state information and indication information of the at least one resource unit. When the base station performs step 202, the base station determines, according to received indication information, the at least one resource unit corresponding to the at least one piece of channel state information.

In another specific embodiment, before the base station performs step 202 and step 203, if the base station receives feedback mode indication information sent by the user equipment, and the feedback mode indication information is used to indicate that a mode in which the user equipment sends channel state information is a first feedback mode or a second feedback mode, the base station performs steps 201 to 203 when the feedback mode indication information indicates the first feedback mode. Alternatively, the base station receives only channel state information of an entire channel between the user equipment and the base station when the feedback mode indication information indicates that the mode in which the user equipment sends the channel state information is the second feedback mode; in this case, the channel state information is information about the entire channel between the user equipment and the base station, and the base station sends data on all resource units according to the channel state information.

The first feedback mode is a manner in which the channel state information is corresponding to the at least one resource unit. The second feedback mode is a manner in which channel state information is not bound to a resource unit and channel state information sent by the user equipment to the base station is information about the entire channel between the user equipment and the base station.

The following describes the data transmission method in this embodiment of the present invention by using specific embodiments. In these specific embodiments, a resource unit used for sending data by a base station is a subframe.

Figure 3:
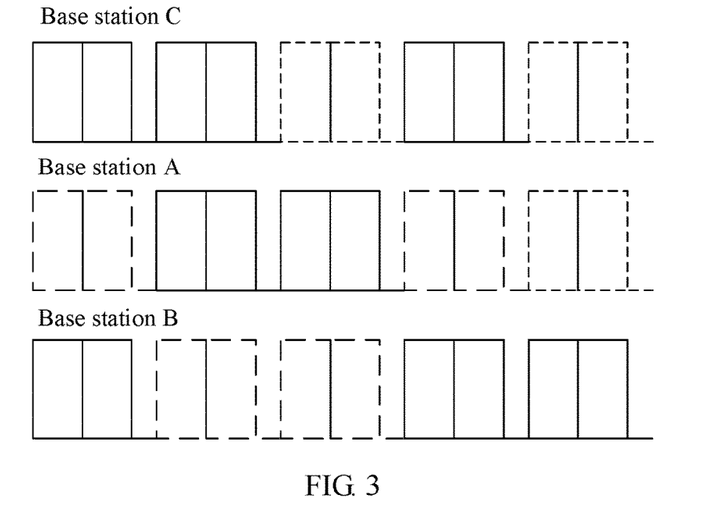
FIG. 3 is a schematic diagram of a frame structure for sending data by multiple base stations in an application embodiment of the present invention.

It is assumed that the base station is a base station C, base stations deployed around the base station C are a base station A and a base station B, the base stations A, B, and C send data in one period according to a frame structure shown in FIG. 3. There are 10 subframes in one period. The base station C sends data in six subframes in one period (in FIG. 3, a solid line indicates that data is sent, and a dashed line indicates that no data is sent), the base station B sends data in four subframes in one period, and the base station A sends data in six subframes in one period.

Figure 4:
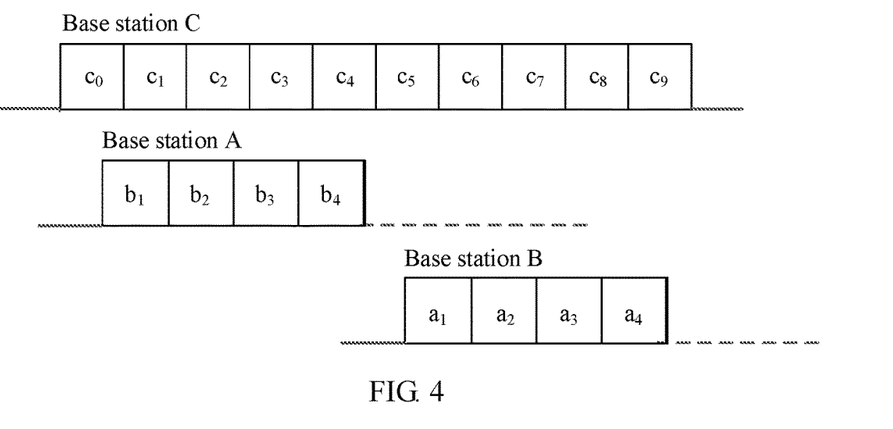
FIG. 4 is a schematic diagram of another frame structure for sending data by multiple base stations in an application embodiment of the present invention.

It should be noted that in FIG. 3, the base stations send data in a strictly-aligned manner, that is, frame structures used by the base stations are required to be the same, and timing also needs to be aligned. In an actual deployment scenario, such strict alignment is rare, and the method in this embodiment is also applicable to a non-strict alignment scenario shown in FIG. 4. For example, in FIG. 4, a subframe used for sending data by a base station C is not aligned with subframes used for sending data by a base station A and a base station B.

(1) User equipment sends, in an explicit association manner, multiple pieces of channel state information and indication information of subframes separately corresponding to the multiple pieces of channel state information.

The user equipment measures data sent by the base station C in each subframe and learns that interference in a subframe 0 and a subframe 1 is similar, that is, the base station C suffers, in both the subframe 0 and the subframe 1, interference caused by sending data by the base station B, interference in a subframe 2 and a subframe 3 is similar, and interference in a subframe 6 and a subframe 7 is similar. A subframe x (x is any number among 0 to 9) represents a subframe numbered x, and x is obtained according to a location order of the subframe in an entire data frame.

In this case, the user equipment may send three groups of information to the base station C, and the three groups of information is specifically: indication information of the subframe 0 and the subframe 1, and first channel state information; indication information of the subframe 2 and the subframe 3, and second channel state information; and indication information of the subframe 6 and the subframe 7, and third channel state information.

In another case, the base station C suffers, in the subframe 0, the subframe 1, the subframe 6, and the subframe 7, interference caused by sending data by the base station B. Therefore interference in the four subframes is similar. As a result, the user equipment may also send two groups of information to the base station C, and the two groups of information is specifically: indication information of the subframe 0, the subframe 1, the subframe 6, and the subframe 7, and first channel state information; and indication information of subframe 2 and subframe 3, and second channel state information.

In this way, after receiving the foregoing groups of information, the base station C may determine, according to each group of information, a subframe corresponding to each piece of channel state information, and then send data in a corresponding subframe according to channel state information.

(2) User equipment sends multiple pieces of channel state information in an implicit association manner.

The user equipment sends multiple pieces of corresponding channel state information to the base station C according to a location order, in an entire data frame, of all subframes required for sending data by the base station C. A sending order is specifically as follows: first channel state information, second channel state information, third channel state information, fourth channel state information, fifth channel state information, and sixth channel state information.

In this way, when receiving the six pieces of channel state information according to the foregoing order, the base station C determines that corresponding subframes are respectively a subframe 0, a subframe 1, a subframe 2, a subframe 3, a subframe 6, and a subframe 7.

(3) User equipment sends, to the base station C, multiple pieces of channel state information and indication information of subframes corresponding to the multiple pieces of channel state information.

The user equipment sends three pieces of channel state information to the base station C in the following order: first channel state information, second channel state information, and third channel state information. The user equipment sends three pieces of indication information to the base station C in the following order: indication information of a subframe 0 and a subframe 1, indication information of a subframe 2 and a subframe 3, and indication information of a subframe 6 and a subframe 7.

When receiving the multiple pieces of channel state information and the multiple pieces of indication information, the base station C determines that one piece of channel state information is corresponding to a subframe indicated by indication information whose receiving order is consistent with an order in which the channel state information is received. Specifically, the first channel state information is corresponding to the subframe 0 and the subframe 1, the second channel state information is corresponding to the subframe 2 and the subframe 3, and the third channel state information is corresponding to the subframe 6 and the subframe 7.

(4) If the base station A and the base station B are not deployed within a preset range of the base station C, the base station C suffers relatively less interference caused by sending data by the base station A and the base station B, and when sending data in all subframes, the base station C suffers relatively even interference. In this way, instead of sending multiple pieces of channel state information and associating each piece of channel state information with a subframe in which the base station C sends data, the user equipment may directly send one piece of channel state information to indicate information about an entire channel between the base station C and the user equipment.

In this case, the user equipment may send feedback mode indication information to the base station C in advance. When the feedback mode indication information indicates a first feedback mode, the user equipment sends channel state information in the foregoing manners (1) to (3); or when the feedback mode indication information indicates a second feedback mode, the user equipment sends only one piece of channel state information.

Figure 5:
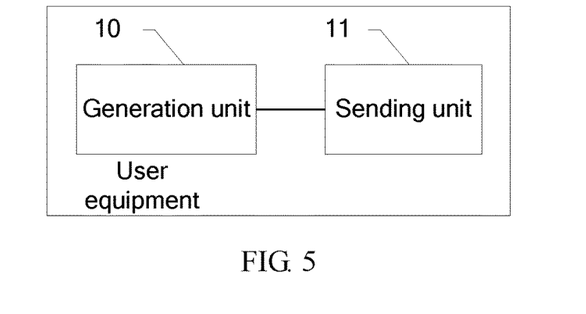
FIG. 5 is a schematic structural diagram of a communications device according to an embodiment of the present invention.

Embodiments of the present invention further provide user equipment, and a schematic structural diagram of the user equipment may be shown in FIG. 5 and includes.

The generation unit 10 is configured to generate at least one piece of channel state information, where each piece of channel state information in the at least one piece of channel state information is corresponding to at least one resource unit required for sending data by a base station.

The generation unit 10 separately estimates multiple sub-channels included in an entire channel between the user equipment in this embodiment and the base station, and then obtains the at least one piece of channel state information. A sub-channel is a sub-channel corresponding to the at least one resource unit required for sending data by the base station to the user equipment in this embodiment.

The sending unit 11 is configured to send, to the base station, the at least one piece of channel state information generated by the generation unit 10, where the at least one piece of channel state information is reference information used for sending data by the base station on the at least one resource unit corresponding to the at least one piece of channel state information.

It can be learned that the user equipment provided in this embodiment of the present invention divides an entire channel into multiple parts (that is, multiple sub-channels) for separate estimation to generate at least one piece of channel state information. The at least one piece of channel state information is separately associated with a resource unit required for sending data by a base station, and the user equipment sends the at least one piece of channel state information to the base station. The at least one piece of channel state information can more accurately reflect interference suffered by the base station when the base station sends data, so as to avoid interference as much as possible when the base station sends data.

In a specific embodiment, a manner in which the sending unit 11 sends the at least one piece of channel state information may specifically include but is not limited to the following manners.

(1) The sending unit 11 is specifically configured to send the at least one piece of channel state information according to an order agreed between the user equipment and the base station. A mapping relationship exists between a sending order of the at least one piece of channel state information and an identifier of the at least one resource unit.

Optionally, the sending unit 11 sends the at least one piece of channel state information to the base station according to a location order, in one data sending period, of the resource unit required for sending data by the base station. Each piece of channel state information in the at least one piece of channel state information is corresponding to a resource unit whose location order is consistent with a sending order of the channel state information.

Optionally, the at least one piece of channel state information sent by the sending unit 11 to the base station according to a specific order is separately and sequentially corresponding to resources units in some locations in one data sending period. For example, the first piece of channel state information sent by the sending unit 11 is corresponding to a resource unit ranked in the first place (or another place) in the data sending period.

(2) The sending unit 11 is further configured to send, to the base station, indication information of the at least one resource unit corresponding to the at least one piece of channel state information. The indication information is used to indicate the at least one resource unit. Specifically, a sending order of the at least one piece of channel state information is determined by the user equipment based on an order agreed between the user equipment and the base station, and a sending order of the indication information is determined by the user equipment based on the agreed order.

In one case, the sending unit 11 is specifically configured to send, to the base station according to the sending order of the at least one piece of channel state information, the indication information of the at least one resource unit corresponding to the at least one piece of channel state information. In this case, the sending unit 11 first sends the channel state information and then sends the indication information. Alternatively, in another case, the sending unit 11 is specifically configured to send, to the base station according to a sending order of the indication information of the at least one resource unit, the channel state information corresponding to the indication information of the at least one resource unit. In this case, the sending unit 11 first sends the indication information and then sends the channel state information. Indication information corresponding to each piece of channel state information in the at least one piece of channel state information includes identifier information of the at least one resource unit.

(3) When sending the at least one piece of channel state information, the sending unit 11 sends the at least one piece of channel state information and indication information of the at least one resource unit corresponding to the at least one piece of channel state information. For example, the sending unit 11 sends at least one group of information to the base station, and each group of information in the at least one group of information includes: one piece of channel state information in the at least one piece of channel state information and indication information of the at least one resource unit.

In another specific embodiment, the sending unit 11 is further configured to send feedback mode indication information to the base station. The feedback mode indication information is used to indicate that a mode in which the user equipment sends channel state information is a first feedback mode or a second feedback mode. When the feedback mode indication information indicates the first feedback mode, the sending unit 11 notifies the generation unit 10 that each piece of channel state information in the at least one piece of channel state information generated by the generation unit 10 is corresponding to the at least one resource unit. The first feedback mode is a manner in which the at least one piece of channel state information is corresponding to the at least one resource unit.

Further, when the feedback mode indication information indicates that the mode in which the user equipment sends channel state information is the second feedback mode, the sending unit 11 further instructs the generation unit 10 to perform joint estimation on the entire channel between the user equipment in this embodiment and the base station to generate only one piece of channel state information. The second feedback mode is a manner in which channel state information is not bound to a resource unit and channel state information sent by the user equipment to the base station is information about the entire channel between the user equipment and the base station.

Figure 6:
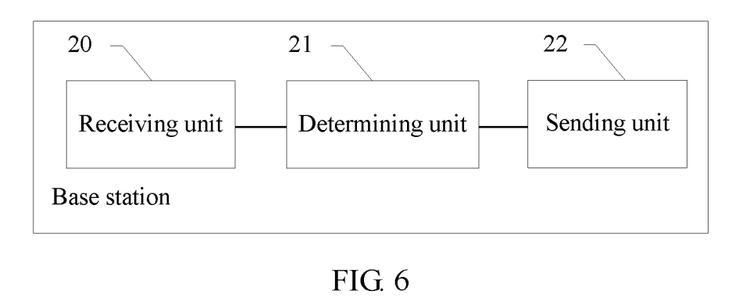
FIG. 6 is a schematic structural diagram of another communications device according to an embodiment of the present invention.

Embodiments of the present invention further provide a base station, and a schematic structural diagram of the base station is shown in FIG. 6, and the base station includes:

a receiving unit 20, configured to receive at least one piece of channel state information sent by user equipment, where each piece of channel state information in the at least one piece of channel state information is corresponding to at least one resource unit required for sending data by the communications device;

a determining unit 21, configured to determine the at least one resource unit corresponding to the at least one piece of channel state information received by the receiving unit 20; and a sending unit 22, configured to send, on the at least one resource unit corresponding to the at least one piece of channel state information, data to the user equipment according to the at least one piece of channel state information received by the receiving unit 21.

When sending data, the base station provided in this embodiment sends data on different resource units by using different pieces of channel state information. The channel state information can more accurately reflect interference suffered by the base station when the base station sends data, so as to avoid interference as much as possible during data sending.

In a specific embodiment, a manner in which the determining unit 21 determines a resource unit corresponding to channel state information may include but is not limited to the following manners.

(1) The determining unit 21 is specifically configured to determine, according to a receiving order of the at least one piece of channel state information, the at least one resource unit corresponding to the at least one piece of channel state information. A mapping relationship exists between the receiving order of the at least one piece of channel state information and an identifier of the at least one resource unit.

In one case, for each piece of channel state information in the at least one piece of channel state information, the determining unit 21 determines that the channel state information is corresponding to a resource unit whose location order in one data sending period is consistent with an order in which the base station receives the channel state information.

(2) The receiving unit 20 is further configured to receive indication information that is of the at least one resource unit corresponding to the at least one piece of channel state information and that is sent by the user equipment. The indication information is used to indicate the at least one resource unit. The determining unit 21 is specifically configured to determine, according to the indication information received by the receiving unit 20, the at least one resource unit separately corresponding to the at least one piece of channel state information.

In one case, when the receiving order of the at least one piece of channel state information is the same as a receiving order of the indication information, a mapping relationship exists between the at least one piece of channel state information and the indication information. For each piece of channel state information in the at least one piece of channel state information, the determining unit 21 is specifically configured to determine that the channel state information is corresponding to a resource unit indicated by indication information whose receiving order is consistent with an order in which the base station receives the channel state information.

In another case, if the receiving unit 20 is specifically configured to receive the at least one piece of channel state information and indication information of the at least one resource unit corresponding to the at least one piece of channel state information, the determining unit 21 is specifically configured to determine the at least one resource unit according to the indication information. The indication information is used to indicate the at least one resource unit.

In another specific embodiment, the foregoing receiving unit 21 is further configured to receive feedback mode indication information sent by the user equipment. The feedback mode indication information is used to indicate that a mode in which the user equipment sends channel state information is a first feedback mode or a second feedback mode. The at least one piece of channel state information is corresponding to the at least one resource unit when the feedback mode indication information indicates the first feedback mode.

The channel state information sent by the user equipment to the base station is information about an entire channel between the user equipment and the base station when the feedback mode indication information indicates the second feedback mode.

Figure 7:
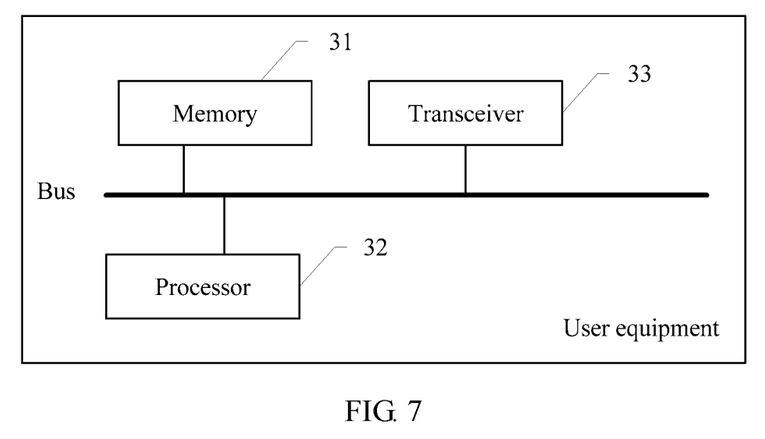
FIG. 7 is a schematic structural diagram of user equipment according to an embodiment of the present invention.

Embodiments of the present invention further provide user equipment, and a schematic structural diagram of the user equipment may be shown in FIG. 7. The user equipment includes: a processor 32 and a transceiver 33 that are separately connected to a bus, and may further include a memory 31.

The memory 31 is configured to store information such as a file necessary for processing data by the processor 32, for example, program code for performing, by the processor 32, the data transmission method described in the embodiment corresponding to FIG. 1.

The processor 32 is configured to perform the following operations:

generating at least one piece of channel state information, where each piece of channel state information in the at least one piece of channel state information is corresponding to at least one resource unit required for sending data by a base station; and controlling the transceiver 33 to send the at least one piece of generated channel state information to the base station, where the at least one piece of channel state information is reference information used for separately sending data by the base station on the at least one resource unit corresponding to the at least one piece of channel state information.

The user equipment provided in this embodiment of the present invention divides an entire channel into multiple parts (that is, multiple sub-channels) for separate estimation to generate at least one piece of channel state information, where the at least one piece of channel state information is separately associated with a resource unit required for sending data by a base station, and the user equipment sends the at least one piece of channel state information to the base station. The at least one piece of channel state information can more accurately reflect interference suffered by the base station when the base station sends data, so as to avoid interference as much as possible when the base station sends data.

Specifically, when generating at least one piece of channel state information, the processor 32 separately estimates multiple sub-channels included in an entire channel between the user equipment in this embodiment and a base station, and then obtains the at least one piece of channel state information. A sub-channel is a sub-channel corresponding to the at least one resource unit required for sending data by the base station to the user equipment in this embodiment.

In a specific embodiment, a manner in which the processor 32 controls the transceiver 33 to send multiple pieces of channel state information may specifically include but is not limited to the following manners.

(1) The processor 32 is specifically configured to control the transceiver 33 to send the at least one piece of channel state information to the base station according to an order agreed between the user equipment and the base station, where a mapping relationship exists between a sending order of the at least one piece of channel state information and an identifier of the at least one resource unit.

The processor 32 controls the transceiver 33 to send the at least one piece of channel state information to the base station according to a location order, in one data sending period, of the resource unit required for sending data by the base station. Each piece of channel state information in the at least one piece of channel state information is corresponding to a resource unit whose location order is consistent with a sending order of the channel state information.

Alternatively, the at least one piece of channel state information sent by the transceiver 33 controlled by the processor 32 according to a specific order is sequentially corresponding to a resource unit in one data sending period. For example, the first piece of channel state information sent by the transceiver 33 is corresponding to a resource unit ranked in the first place (or another place) in one data sending period.

(2) The processor 32 is further configured to control the transceiver 33 to send, to the base station, indication information of the at least one resource unit corresponding to the at least one piece of channel state information, where the indication information is used to indicate the at least one resource unit. A sending order of the at least one piece of channel state information is determined by the user equipment based on an order agreed between the user equipment and the base station, and a sending order of the indication information is determined by the user equipment based on the agreed order.

In one case, the processor 32 is specifically configured to control the transceiver 33 to send, to the base station according to the sending order of the at least one piece of channel state information, the indication information of the at least one resource unit corresponding to the at least one piece of channel state information. In this case, the transceiver 33 first sends the channel state information and then sends the indication information. In another case, the processor 32 is specifically configured to control the transceiver 33 to send, to the base station according to a sending order of the indication information of the at least one resource unit, the channel state information separately corresponding to the indication information of the at least one resource unit. In this case, the transceiver 33 first sends the indication information and then sends the channel state information. Indication information corresponding to each piece of channel state information in the at least one piece of channel state information includes identifier information of the at least one resource unit.

(3) The processor 32 controls the transceiver 33 to send, to the base station, the at least one piece of channel state information and indication information of the at least one resource unit separately corresponding to the at least one piece of channel state information. For example, the processor 32 controls the transceiver 33 to send at least one group of information to the base station, and each group of information in the at least one group of information includes: one piece of channel state information in the at least one piece of channel state information and indication information of the at least one resource unit.

In another specific embodiment, the processor 32 is further configured to control the transceiver 33 to send feedback mode indication information to the base station. The feedback mode indication information is used to indicate that a mode in which the user equipment sends channel state information is a first feedback mode or a second feedback mode. Each piece of channel state information in the at least one piece of channel state information generated by the processor 32 is corresponding to the at least one resource unit when the feedback mode indication information indicates the first feedback mode. The first feedback mode is a manner in which the channel state information is corresponding to the at least one resource unit.

Further, when the feedback mode indication information indicates that the mode in which the user equipment sends channel state information is the second feedback mode, the processor 32 performs joint estimation on the entire channel between the user equipment in this embodiment and the base station to generate channel state information of the entire channel. The second feedback mode is a manner in which channel state information is not bound to a resource unit and channel state information sent by the user equipment to the base station is information about the entire channel between the user equipment and the base station.

Figure 8:
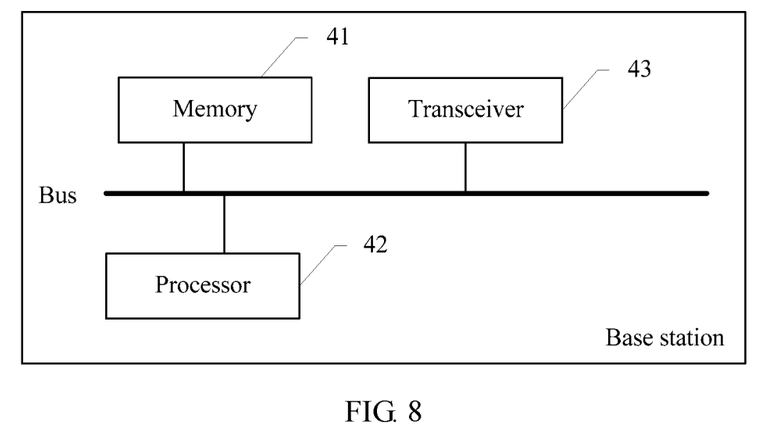
FIG. 8 is a schematic structural diagram of a base station according to an embodiment of the present invention.

Embodiments of the present invention further provide a base station, and a schematic structural diagram of the base station is shown in FIG. 8. The base station includes: a processor 42 and a transceiver 43 that are separately connected to a bus, and may further include a memory 41.

The memory 41 is configured to store information such as a file necessary for processing data by the processor 42, for example, program code for performing, by the processor 42, the data transmission method described in the embodiment corresponding to FIG. 2.

The transceiver 43 is configured to receive at least one piece of channel state information sent by user equipment, where each piece of channel state information in the at least one piece of channel state information is corresponding to at least one resource unit required for sending data by the base station.

The processor 42 is configured to perform the following operations:

when the transceiver 43 receives at least one piece of channel state information, determining at least one resource unit corresponding to the at least one piece of channel state information received by the transceiver 43, where each piece of channel state information in the at least one piece of channel state information is corresponding to the at least one resource unit required for sending data by the base station; and controlling, according to the at least one piece of channel state information received by the transceiver 43, the transceiver 43 to send data to the user equipment on the at least one resource unit corresponding to the at least one piece of channel state information.

When sending data, the base station provided in this embodiment sends data on different resource units by using different pieces of channel state information. The channel state information can more accurately reflect interference suffered by the base station when the base station sends data, so as to avoid interference as much as possible during data sending.

In a specific embodiment, a manner in which the processor 42 determines a resource unit corresponding to channel state information may include but is not limited to the following manners.

(1) The processor 42 is specifically configured to determine, according to a receiving order of the at least one piece of channel state information, the at least one resource unit corresponding to the at least one piece of channel state information, where a mapping relationship exists between the receiving order of the at least one piece of channel state information and an identifier of the at least one resource unit.

In one case, for each piece of channel state information in the at least one piece of channel state information, the processor 42 determines that the channel state information is corresponding to a resource unit whose location order in one data sending period is consistent with an order in which the base station receives the channel state information.

(2) The transceiver 44 is further configured to receive indication information that is of the at least one resource unit corresponding to the at least one piece of channel state information and that is sent by the user equipment, and the processor 42 is specifically configured to determine, according to the indication information received by the transceiver 43, the at least one resource unit corresponding to the at least one piece of channel state information.

In one case, when the receiving order of the at least one piece of channel state information is the same as a receiving order of the indication information, a mapping relationship exists between the at least one piece of channel state information and the indication information.

In another case, if the transceiver 43 is specifically configured to receive the at least one piece of channel state information and the indication information of the at least one resource unit corresponding to the at least one piece of channel state information, the processor 42 is specifically configured to determine, according to the indication information received by the base station, the at least one resource unit corresponding to the at least one piece of channel state information.

In another specific embodiment, the foregoing transceiver 43 is further configured to receive feedback mode indication information sent by the user equipment. The feedback mode indication information is used to indicate that a mode in which the user equipment sends channel state information is a first feedback mode or a second feedback mode. The transceiver 43 receives the at least one piece of channel state information when the feedback mode indication information indicates the first feedback mode. The first feedback mode is a manner in which the channel state information is corresponding to the at least one resource unit. The transceiver 43 receives channel state information between the user equipment and the base station in this embodiment when the feedback mode indication information indicates that the mode in which the user equipment sends channel state information is the second feedback mode, and the channel state information is used to indicate information about an entire channel between the base station in this embodiment and the user equipment. The second feedback mode is a manner in which channel state information is not bound to a resource unit and channel state information sent by the user equipment to the base station is information about the entire channel between the user equipment and the base station.

Embodiments of the present invention further provide a data transmission system, including user equipment and a base station. A structure of the user equipment may be a structure of the user equipment shown in FIG. 5, a structure of the base station may be a structure of the base station shown in FIG. 6, and details are not described herein.

Alternatively, a structure of the user equipment may be a structure of the user equipment shown in FIG. 7, a structure of the base station may be a structure of the base station shown in FIG. 8, and details are not described herein.

A person of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The data transmission method, the system and the device provided in the embodiments of the present invention are described in detail above. The principle and implementation of the present invention are described herein through specific examples. The description about the embodiments is merely provided to help understand the method and core ideas of the present invention. In addition, a person of ordinary skill in the art can make variations and modifications in terms of the specific implementations and application scopes according to the ideas of the present invention. In conclusion, the content of specification shall not be construed as a limit to the present invention.

What is claimed is:

1. A data transmission method comprising:
estimating, by a user equipment, a transmission characteristic of each of multiple sub-channels of a communications channel between the user equipment and a base station to obtain channel state information for either each of the sub-channels or one or more groups of the sub-channels,
wherein each piece of the channel state information is associated with a resource unit, which is a minimum unit of a resource of the communications channel used for sending data by the base station, and
wherein each piece of the channel state information includes either unique information for each resource unit or unique information for a group of resource units, depending on the similarities of the transmission characteristics of the multiple sub-channels; and
sending, by the user equipment, the channel state information to the base station,
wherein the channel state information includes reference information used for sending data by the base station on each of the resource units corresponding to one of the pieces of the channel state information.

2. The method according to claim 1, wherein
a sending order of the channel state information is determined by the user equipment based on an order agreed between the user equipment and the base station, and a mapping relationship exists between the sending order of each piece of channel station information and an identifier of each of the resource units.

3. The method according to claim 1, wherein the method further comprises:
sending, by the user equipment to the base station, indication information of each of the resource units corresponding to each piece of channel state information, wherein the indication information indicates the resource unit.

4. The method according to claim 3, wherein
a sending order of the pieces of channel state information is determined by the user equipment based on an order agreed between the user equipment and the base station, and a sending order of the indication information is determined by the user equipment based on the order agreed between the user equipment and the base station.

5. The method according to claim 1, wherein
the sending, by the user equipment, each piece of channel state information to the base station comprises: sending, by the user equipment to the base station, the piece of channel state information and indication information of the resource unit corresponding to the piece of channel state information, wherein the indication information is used to indicate the resource unit.

6. The method according to claim 1, wherein the method further comprises:
sending, by the user equipment, feedback mode indication information to the base station, wherein
the feedback mode indication information is used to indicate that a mode in which the user equipment sends channel state information is a first feedback mode or a second feedback mode; and
each piece of channel state information corresponds to one of the resource units when the feedback mode indication information indicates the first feedback mode; or
the channel state information sent by the user equipment to the base station is information about an entire channel between the user equipment and the base station when the feedback mode indication information indicates the second feedback mode.

7. A data transmission method for a communication channel between user equipment and a base station, the method comprising:
- receiving, by the base station, pieces of channel state information sent by a user equipment, wherein each piece of channel state information corresponds to a resource unit of a resource of the communication channel required for sending data by the base station,
- wherein each resource unit is a minimum unit of the resource of the communication channel for sending data by the base station, each of the pieces of channel state information is an estimated transmission characteristic of each of the multiple sub-channels obtained by the user equipment by dividing the communication channel into sub-channels and each of the multiple sub-channels is associated with each one of the resource units and
- wherein each piece of the channel state information includes either unique information for each resource unit or unique information for a group of resource units, depending on the similarities of the transmission characteristics of the multiple sub-channels;
- determining, by the base station, each of the resource units corresponding to each piece of channel state information; and
- sending, by the base station on each of the resource units corresponding to each piece of the channel state information, data to the user equipment according to each piece of the channel state information.

8. The method according to claim 7, wherein determining each of the resource units corresponding to each piece of channel state information comprises:
- determining, according to a receiving order of the pieces of channel state information, each of the resource units corresponding to each of the pieces of channel state information, wherein a mapping relationship exists between the receiving order of the pieces of channel state information and an identifier of each one of the resource units.

9. The method according to claim 7, before determining each of the resource units corresponding to each piece of channel state information, the method further comprising:
- receiving, by the base station, indication information of each resource unit corresponding to each piece of channel state information that is sent by the user equipment, wherein each of the indication information indicates one of the resource units; and
- wherein determining each resource unit corresponding each piece of channel state information comprises:
determining, by the base station, each of the resource units according to the indication information.

10. The method according to claim 9, wherein when a receiving order of one of the pieces of channel state information is the same as a receiving order of the indication information, a mapping relationship exists between each of the pieces of channel state information and each of the indication information.

11. The method according to claim 7, wherein receiving each piece of channel state information sent by the user equipment comprises:
- receiving, by the base station, each of the pieces of channel state information and indication information of each of the resource units corresponding to each of the pieces of channel state information that is sent by the user equipment, wherein each indication information indicates one of the resource units; and
- wherein determining each resource unit corresponding to each of the pieces of channel state information comprises:
determining, by the base station, each of the resource units according to the indication information.

12. The method according to claim 7, wherein before determining each of the resource units corresponding to each of the pieces of channel state information, the method further comprising:
- receiving, by the base station, feedback mode indication information sent by the user equipment, wherein the feedback mode indication information is used to indicate that a mode in which the user equipment sends channel state information is a first feedback mode or a second feedback mode; and
- each of the pieces of channel state information corresponds to each of the resource units when the feedback mode indication information indicates the first feedback mode; or
- the channel state information sent by the user equipment to the base station is information about an entire channel between the user equipment and the base station when the feedback mode indication information indicates the second feedback mode.

13. A user equipment comprising a processor and a transmitter that are separately connected to a bus, wherein the processor is configured to perform the following operations:
- estimating a transmission characteristic of each of multiple sub-channels of a communications channel between the user equipment and a base station to obtain channel state information for either each of the sub-channels or one or more groups of the sub-channels,
    - wherein each piece of the channel state information is associated with a resource unit, which is a minimum unit of a resource of the communications channel used for sending data by the base station, and
    - wherein each piece of the channel state information includes either unique information for each resource unit or unique information for a group of resource units, depending on the similarities of the transmission characteristics of the multiple sub-channels; and
- controlling the transmitter to send the channel state information to the base station,
    - wherein the channel state information includes reference information used for sending data by the base station on each of the resource units corresponding to one of the pieces of channel state information.

14. The user equipment according to claim 13, wherein a sending order of the pieces of channel state information is determined by the user equipment based on an order agreed between the user equipment and the base station, and a mapping relationship exists between the sending order of each of the pieces of channel station information and each of an identifier of each of the resource units.

15. The user equipment according to claim 13, wherein the processor is further configured to
- control the transmitter to send, to the base station, indication information of each of the resource units corresponding to each of the pieces of channel state information, wherein each of the indication information indicates one of the resource units.

16. The user equipment according to claim 15, wherein a sending order of the pieces of channel state information is determined by the user equipment based on an order agreed between the user equipment and the base station, and a sending order of the indication information is determined by the user equipment based on the order agreed between the user equipment and the base station.

17. The user equipment according to claim 13, wherein the processor is configured to control the transmitter to send, to the base station, each of the pieces of channel state information and indication information of each of the resource units corresponding to each of the pieces of channel state information, wherein each of the indication information indicates one of the resource units.

18. The user equipment according to claim 13, wherein the processor is further configured to control the transmitter to send feedback mode indication information to the base station, wherein the feedback mode indication information is used to indicate that a mode in which the user equipment sends channel state information is a first feedback mode or a second feedback mode; and each of the pieces of channel state information corresponds to each of the resource units when the feedback mode indication information indicates the first feedback mode; or the channel state information sent by the user equipment to the base station is information about an entire channel between the user equipment and the base station when the feedback mode indication information indicates the second feedback mode.

* * * * *